United States Patent [19]

Takase et al.

[11] Patent Number: 4,916,598
[45] Date of Patent: Apr. 10, 1990

[54] APPARATUS FOR DISCERNING FAULTY SWITCHING DEVICE

[75] Inventors: Shinichi Takase, Ebina; Masayuki Ishii, Yokohama, both of Japan

[73] Assignee: Neturen Company Limited, Tokyo, Japan

[21] Appl. No.: 347,820

[22] Filed: May 4, 1989

[51] Int. Cl.⁴ .......................................... H02H 7/125
[52] U.S. Cl. ........................................ 363/55; 363/56
[58] Field of Search ............................. 363/55, 56, 58

[56] References Cited

U.S. PATENT DOCUMENTS 3,611,108 10/1971 Susumu et al. ..................... 363/58
4,126,819 11/1978 Stobbe et al. ...................... 363/56
4,777,579 10/1988 Jahns et al. ....................... 363/132

FOREIGN PATENT DOCUMENTS 62-10106  3/1987  Japan .

Primary Examiner—Patrick R. Salce
Assistant Examiner—Jeffrey Sterrett
Attorney, Agent, or Firm—Wenderoth, Lind & Ponack

[57] ABSTRACT

An apparatus for detecting a faulty switching device of a current-supply type full-bridge inverter includes current transformers connected to each pair of series connected switching devices of the inverter. A differential amplifier is provided for subtracting one detected current value output by one current transformer from another detected current value output by another current transformer. A rectifier is provided for smoothing and rectifying the output of the differential amplifier, and a comparator is provided for comparing the smoothed and rectified output of the rectifier with a reference value.

4 Claims, 2 Drawing Sheets

APPARATUS FOR DISCERNING FAULTY SWITCHING DEVICE

FIELD OF THE INVENTION

The present invention is related to an apparatus capable of accurately discerning between normal and malfunctioning switching devices of a current-supply type full-bridge inverter having each arm comprising a plurality of switching devices connected in parallel.

DESCRIPTION OF THE INVENTION

It is known to arrange each arm in a current-supply type full-bridge inverter with a plurality of switching devices connected in parallel. The conventional method for discerning a fault of a plurality of switching devices used in the inverter of this type is found, for example, in the apparatus disclosed in Japanese Patent Publication 1987-10106 (Japanese Patent No. 1409459). The above-cited apparatus includes a power supply for detecting troubles and a detecting toroidal coil disposed on each current path of the switching devices or a detecting coil inductive-coupled to each balancer coil of each switching device. The normal switching devices can be discerned from faulty switching devices by determining whether or not there is an induced voltage in the detecting coil when the inverter circuit is energized by the power supply for trouble-detection after the inverter is shutdown and each switching device is deenergized.

However, the above-cited apparatus is not capable of discerning a fault while the inverter is in operation and has to be used to localize a faulty switching device resulting from an open-circuit, even though a faulty switching device resulting from a short-circuit can be discerned.

Still furthermore, a trouble caused by a short-circuit cannot be discerned when diodes are series-connected in the circuit of the switching device.

On the other hand, the inventors have searched the prior art for devices capable of discerning normal switching devices from malfunctioning switching devices when the inverter is in operation. As a result, it is clear that a method has been available for discerning the breakdown of switching devices in the current path, for instance, by a blown fuse which is provided in each current path of each switching device. This method, however, is not dependable since the inspection often revealed that the switching devices had not been affected even with the fuse being blown, and the inspection also involved troublesome procedures.

Thus, the inventors believe that there are no prior art devices capable of discerning readily and accurately a trouble of a single device among a plurality of switching devices in a full-bridge inverter with each arm comprising a plurality of switching devices connected in parallel, while in operation.

Furthermore, the normal and faulty switching devices have been discerned from the overall operating conditions by reading meters indicating the operating state of the inverter so far as a conventional method is concerned. If found to be at fault, the faulty device has been discerned by checking a number of switching devices on a one on one basis while the inverter is shutdown. When each arm comprises a plurality of parallel connected switching devices, a fault in a single switching device in an arm due to, for instance, an open-circuit will not result in the malfunction of the inverter since the output voltage is maintained by another switching device in the arm concerned, taking over the faulty device, so that the monitoring of the voltage sees no fault, making it extremely difficult for even an expert to find the trouble.

An open-circuit fault, once it has occurred, may result in an overload of the taking-over switching devices, thus affecting all the switching devices in the arm and eventually shutting down the inverter.

While a single faulty switching device in an arm caused by short-circuit may result in an instable operation of the inverter, the operator has often overlooked it for lack of knowledge of the inverter and has not been able to prevent the break of the heated circuit having the shorted faulty switching device, and thus resulting in an overload of the other switching devices, in a similar nature as the case described above regarding an open-circuit.

Thus, an inverter expert often discovers a number of faulty switching devices at inspection, thereby incurring damage resulting from the shutdown of the inverter and the replacement costs of the switching devices.

OBJECT OF THE INVENTION

It is an object of the present invention to provide an apparatus for readily discerning a faulty device of any one of a plurality of switching devices of an inverter while the inverter is in operation, wherein the inverter is a current-supply type full-bridge inverter having each arm comprising a plurality of switching devices connected in parallel.

It is another object of the present invention to provide an apparatus for narrowing down the faulty devices to any particular four among a plurality of switching devices used in the inverter, thereby facilitating the identification of the faulty device. It is still another object of the present invention to provide an apparatus for keeping the fault of a single switching device in any arm from spreading to a plurality of other switching devices in the same arm, thereby avoiding troubles in succession.

It is a further object of the present invention to provide an apparatus for preventing damage from spreading by readily discerning a fault of single switching device to thereby enable repair of the faulty switching device.

Other features and benefits of the present invention will become apparent by the following description with reference to the accompanying drawings.

DETAILED DESCRIPTION OF THE INVENTION

The present invention is described below in detail with the reference to FIG. 1 through FIG. 3.

Figure 1:
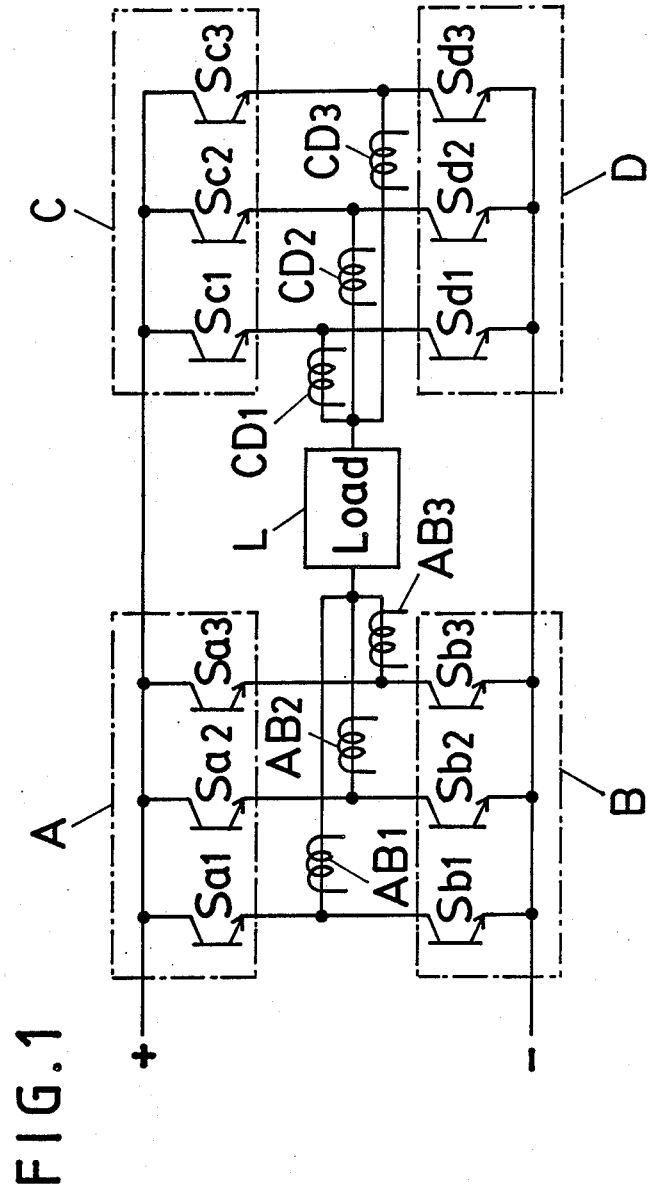
FIG. 1 is a schematic representation of the main circuit of the current-supply type full-bridge inverter referred to in the present invention.

FIG. 1 is a schematic representation of an example of the main circuit of a current-supply type full-bridge inverter, where L denotes a load, A through D denote arms which are full-bridge connected to the load L, Sa1 through Sd 3 denote switching devices such as transistors, in which Sa1 to Sa3 form arm A in a parallel connection, Sb1 through Sb3 form arm B in a parallel connection, Sc1 through Sc3 form arm C in a parallel connection, and Sd1 through Sd3 form arm D in a parallel connection.

Current transformers AB1 through CD3 are disposed in the circuit on the side of load L shared by the switching devices which are series connected as shown. For example, AB1 is disposed in the circuit on the side of load L shared by switching devices Sa1 and Sb1 which are connected in series. Each arm A to D comprises a plurality of switching devices connected in parallel as described above and as shown in FIG. 1.

Thus, six current transformers AB1 through CD3 are provided as illustrated when each arm comprises three switching devices in parallel connection. Eight current transformers would be employed if each arm comprised four switching devices in parallel connection. The current values described by each current transformer AB1 through CD3 are paired with the load L between, for example, like paired current transformers AB1-CD1, AB2-CD2, AB3-CD3, and processed as later described.

Figure 2:
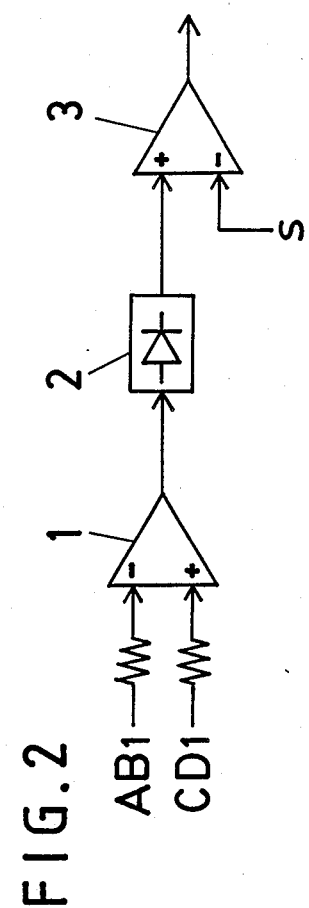
FIG. 2 is a schematic diagram of the circuit representing the main section of an apparatus for discerning a faulty switching device of the present invention.

FIG. 2 shows a section of the main circuit of the discerning apparatus of the present invention, wherein 1 denotes a differential amplifier for receiving the detected output from paired current transformers AB1, CD1, 2 denotes a full-wave rectifier having as its input the output of the differential amplifier 1, and 3 denotes a comparator for comparing the output from the full-wave rectifier with a reference value s.

The comparator 1 is arranged so that, for example, the output from the current transformer AB1 is made available to the −input terminal and the output from current transformer CD1 to the +input terminal. The differential amplifier 1 is set beforehand to provide an output at level 0, with the current values from current transformers AB1 and CD1 used as reference values, when the inverter is in a normal operation condition.

The full-wave rectifier 2 is provided to the +input terminal of the comparator 3 and the reference value s is provided to the −input terminal, wherein the reference value is at level 0 in the present invention.

The operation of the circuit shown in FIG. 2 is described below with reference to the operating waveform chart shown in FIG. 3. The first set of waveforms shown depict the situation where swtiching devices Sa1 and Sd1 or Sb1 and Sc1 are operating properly. Current transformer AB1 and CD2 output square waves respectively, as shown in the figure, to the differential amplifier 1 upon energizing the switching devices. Thus, the differential amplifier 1 outputs at level 0 according to the above-described present condition. Therefore, when the output is smoothed through full-wave rectifier 2 and is compared with the reference value s=0 by the comparator 3, the output from the comparator 3 is at level 0.

The normal functioning of the four switching devices Sa1, Sb1, Sc1 and Sd1 relating to the current transformers AB1 and CD1 can be discerned when the output from said comparator 3 is at level 0.

Figure 3A:
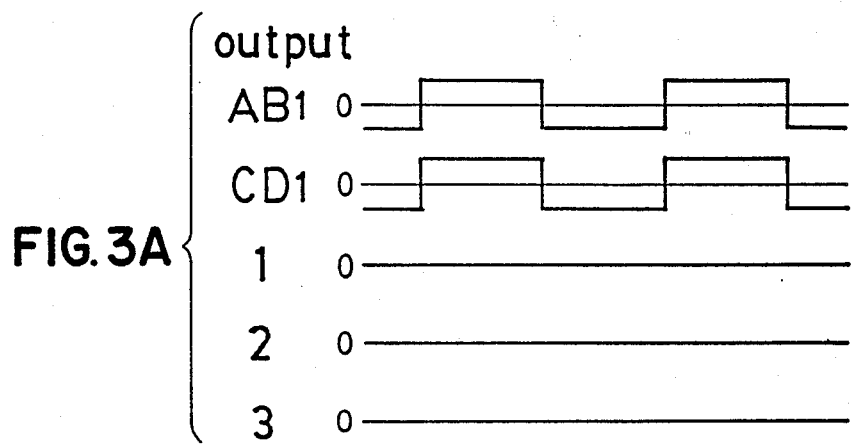
FIG. 3 is an operating wave form chart in the circuit shown in FIG. 2.
Figure 3B:
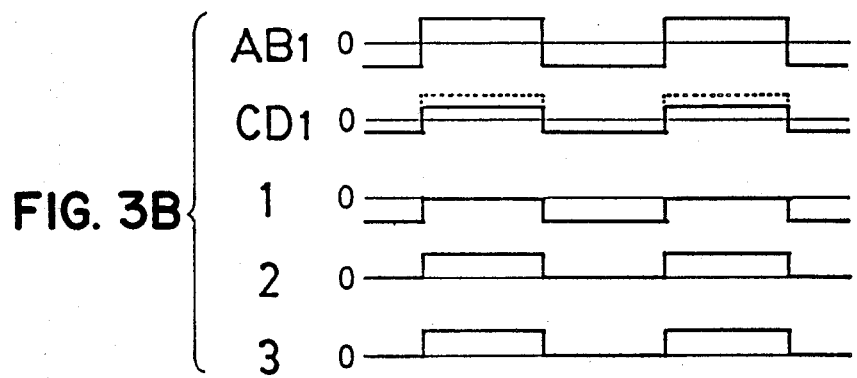
Figure 3C:
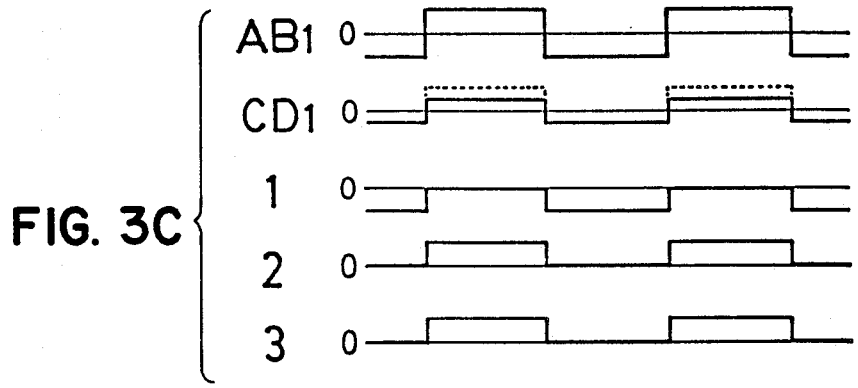

The second set of waveforms shown in FIG. 3 depict the situation where switching device Sd1 or Sc1 is open-circuited. Normal square waves are provided to differential amplifier 1 from current transformers AB1, whereas the input from current transformer CD1 conducts only at half cycle due to the open-fault, resulting in a small amplitude. Accordingly, the differential amplifier 1 makes the voltage differential available to the full-wave rectifier 2 as illustrated and the comparator 3 effects and output at level 1 due to the difference between the output from the full-wave rectifier 2 and the reference value s=0.

With said output level 1, a trouble of any single switching device out of the four (Sa1, Sb1, Sc1 and Sd1) relating to current transformers AB1 and CD1 is readily discerned, for example, by arranging an alarm according to a conventional method. An output level 1 from the comparator 3, according to the principles similar to those described above, is also effected when switching device Sa1 or Sb1 is open-circuited. Therefore, the present invention readily discerns a trouble with any one of the four switching devices relating to current transformers AB1 and CD1.

The third set of waveforms shown in FIG. 3 depict the situation where either switching device Sd1 or Sc1 is shorted. The differential amplifier 1 has normal square waves input thereto from current transformer AB1, whereas the input from current transformer CD1 is bypassed as the current conducts at half cycle through the shorted device, thus resulting in a small amplitude. Thus, differential amplifier 1 provides the voltage differentials to the full-wave rectifier 2 as illustrated and the comparator 3 effects and output level 1 upon comparison of the output from the full-wave rectifier 2 with the reference value s=0 readily discerned.

With an output level 1 from the comparator 3, a trouble of any one of the four switching devices relating to current transformers AB1 and CD1 (Sa1, Sb1, Sc1 or Sd1) is readily discerned. Also, when switching device Sa1 or Sb1 is shorted, the comparator 3 effects an output level 1 according to principles similar to those described above, thereby readily discerning a trouble of any one of the four switching devices relating to current transformers AB1 and CD1.

Accordingly, the outputs from the paired current transformers AB2, CD2, and AB3, CD3 are processed by a discerning circuit arranged in the same way as in FIG. 2 and a trouble of the switching devices concerned is readily discerned as described above.

Thus, an open-circuit or a closed-circuit fault of any single switching device among the plurality of devices comprising an inverter is readily discerned and the identification of a faulty switching device is reduced to one of a particular four switching devices when the comparator 3 provides an output level 1. The paired current transformers with load L between are not limited to the pairs referred to above. For example, the pairs of AB1 and CD2, AB2 and CD1, AB3 and CD2 will do just as well in their performances and effects.

Although reference has been made to arms comprising three switching devices connected on parallel, the applicability of the present invention is of course independent of the number of the switching devices provided in each arm.

The present invention as described above readily discerns any open-circuit or short-circuit fault of a single switching device among a plurality of devices in any arm, where each arm in the current-supply type inverter comprises a plurality of switching devices connected in parallel. The present invention has an additional advantage of reducing the identification of the faulty device to one of a possible four.

The replacement of the faulty device with a normal switching device is all that is required and the conventional problem of a single trouble affecting the spreading to other devices in the same arm can be prevented.

Moreover, the present invention has a rather simple construction and low equipment cost as compared with the damage resulting from the spread of a single faulty device.

We claim:

1. An apparatus for detecting a faulty switching device of a current-supply type full-bridge inverter having a plurality of arms, each arm including a plurality of parallel connected switching devices, each of said plurality of switching devices of one arm being series connected to a corresponding switching device of one other arm, said apparatus comprising:

first and second current transformer means for outputting first and second detected current valves, said first current transformer having means for connection to one of the series connected switching devices and to a load, said second current transformer having means for connection to another one of the series connected switching devices and to the load;

a differential amplifier means, connected to said first and second transformer means, for subtracting said first and second detected current values, and for outputting a subtracted signal in accordance with the thus subtracted first and second detected values; and a comparator means, connected to said differential amplifier means, for comparing said subtracted signal with a reference value, and for outputting a first detection signal when said subtracted signal and said reference value are the same, and for outputting a first detection signal which is different from said first detection signal when said subtracted signal and said reference value are different.

2. An apparatus as recited in claim 1, further comprising a rectifying means, connected between said differential amplifier means and said comparator means, for rectifying and smoothing said subtracted signal output by said differential amplifier means, and for providing the thus rectified and smoothed subtracted signal to said comparator means.

3. An apparatus as recited in claim 1, wherein said differential amplifier means outputs said subtracted value as having a value other than 0 when said first and second detected current values are different, and wherein said reference value is 0, and wherein said comparator means outputs said second detected value as having a value other than 0 when said subtracted value and said reference value are different, wherein when said second detected value having a value other than 0 is output from said comparator means, an indication of a fault in one of the series connected switching devices connect to said first and second current transformer means is provided.

4. An apparatus as recited in claim 3, wherein said differential amplifier means outputs said subtracted value as having a value other than 0 when said first and second detected current values are different, and wherein said reference value is 0, and wherein said comparator means outputs said second detected value as having a value other than 0 when said subtracted value and said reference value are different, wherein when said second detected value having a value other than 0 is output from said comparator means, an indication of a fault in one of the series connected switching devices connect to said first and second current transformer means is provided.

* * * * *